E. Duncan,
Provision Safe.

N° 51,573. Patented Dec. 19, 1865.

Witnesses:

Inventor:
E. Duncan

UNITED STATES PATENT OFFICE.

ELI DUNCAN, OF WEST MILTON, OHIO.

MEAT-SAFE.

Specification forming part of Letters Patent No. 51,573, dated December 19, 1865.

*To all whom it may concern:*

Be it known that I, ELI DUNCAN, of West Milton, in the county of Miami and State of Ohio, have invented a new and useful Improvement in Meat-Safes; and I do hereby declare that the following is a full, clear, and exact description thereof, which will enable others skilled in the art to make and use the same, reference being had to the accompanying drawings, forming part of this specification.

This invention relates to a safe to be used for the preservation of smoked meat from decay and putrefaction; and it consists, first, in producing a thorough ventilation of the safe, and, second, in the use of a supplementary safe attached to or forming a part of the principal or main safe, in which additional safe the meat being used from time to time can be kept, thus avoiding the necessity of often opening the large or main safe, the advantages of which are manifest.

In accompanying plate of drawings my improvements are illustrated.

Figure 1:
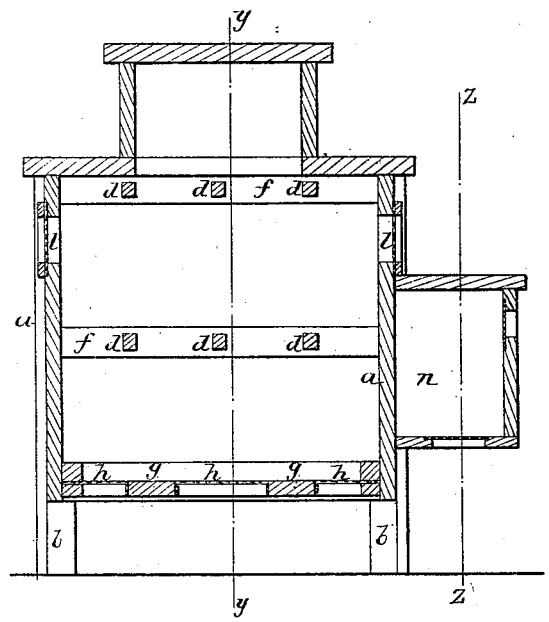
Figure 2:
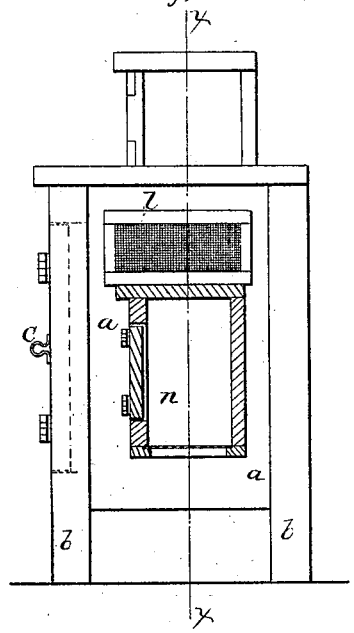
Figure 3:
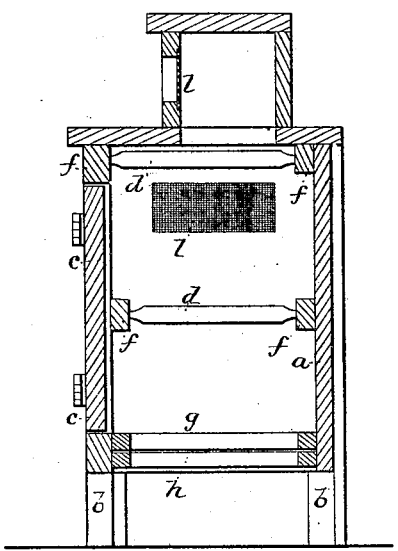

Figure 1 is a central vertical section taken in the plane of the line $x\,x$. Fig. 2 is a similar section, but taken in the plane of the line $y\,y$, Fig. 1, and Fig. 3 is a vertical section taken in the plane of the line $z\,z$, Fig. 1.

$a\,a$ in the drawings represent the main or principal safe, supported on legs $b\,b$, and made of a square or any suitable shape, having doors $c\,c$ properly hung upon hinges for communicating with the interior thereof.

$d\,d\,d$ are a series of cross-rods in safe $a$, supported upon fixed beams or rods $f\,f$ of the same, on which cross-rods the meat to be preserved when put in the safe is hung in any proper manner.

The bottom piece, $g\,g$, of the safe is made open and protected with wire gauze or netting, or other suitable open net-work or other material $h$, which will allow the air to pass through the same into the interior of the safe, from whence it escapes through ventilating-openings $l\,l$ in the top or sides of the safe, or both, similarly protected with wire-netting or other suitable material.

From the above explanation it is apparent that a safe for meat is provided wherein the meat can be always kept sweet and free from putrefaction, as a current of air is continually preserved within and through the safe, carrying off with it all vapors which may arise from the meat, while at the same time the bugs, flies, and other insects are prevented from entering the safe.

But in order to prevent a too frequent opening of the main or principal safe $a$, which would probably soon cause the meat therein to spoil, I use, in addition to the same, a smaller and supplementary meat-safe, $n$, similarly constructed and arranged as the other or principal one, in which meat—such as is being used from day to day—may be placed, and thus be convenient for use without exposing such a large quantity to the attacks of bugs, flies, and other insects each time any of it is wanted, as would be the case were the two safes not arranged together as explained.

I claim as new and desire to secure by Letters Patent—

A meat or provision safe constructed and arranged as and for the purposes herein specified.

ELI DUNCAN.

Witnesses:
 WILLIAM I. THOMAS, Jr.,
 H. S. RAVENSCROFT.